（12）United States Patent
Ni

(10) Patent No.: US 10,250,858 B2
(45) Date of Patent: Apr. 2, 2019

(54) STAGE LAMP BASED ON TCP/IP PROTOCOL AND CONTROL SYSTEM THEREOF

(71) Applicant: Qiyou Ni, Guangzhou (CN)

(72) Inventor: Qiyou Ni, Guangzhou (CN)

( * ) Notice: Subject to any disclaimer, the term of this patent is extended or adjusted under 35 U.S.C. 154(b) by 2 days.

(21) Appl. No.: 15/196,488

(22) Filed: Jun. 29, 2016

(65) Prior Publication Data

US 2017/0302896 A1      Oct. 19, 2017

(30) Foreign Application Priority Data

Apr. 19, 2016   (CN) .......................... 2016 1 0243987

(51) Int. Cl.
| | |
|---|---|
| *H05B 33/08* | (2006.01) |
| *H04N 9/31* | (2006.01) |
| *G06F 3/0484* | (2013.01) |
| *G06T 17/05* | (2011.01) |
| *H05B 37/02* | (2006.01) |
| *G08C 17/02* | (2006.01) |
| *G06F 3/0354* | (2013.01) |
| *G06F 3/0488* | (2013.01) |
| *H04L 29/06* | (2006.01) |

(52) U.S. Cl.
CPC ....... *H04N 9/3179* (2013.01); *G06F 3/04842* (2013.01); *G06T 17/05* (2013.01); *G08C 17/02* (2013.01); *H04N 9/3141* (2013.01); *H05B 37/029* (2013.01); *H05B 37/0272* (2013.01); *G06F 3/03543* (2013.01); *G06F 3/04883* (2013.01); *G08C 2201/42* (2013.01); *G08C 2201/93* (2013.01); *H04L 65/608* (2013.01); *Y02B 20/42* (2013.01)

(58) Field of Classification Search
None
See application file for complete search history.

(56) References Cited

U.S. PATENT DOCUMENTS

| | | | | |
|---|---|---|---|---|
| 6,736,528 B2 * | 5/2004 | Hewlett | ............. | G02B 26/0833 362/233 |
| 8,408,727 B2 * | 4/2013 | Lee | .................... | H05B 37/0272 315/149 |
| 2005/0275626 A1 * | 12/2005 | Mueller | ............. | H05B 37/0245 345/156 |

* cited by examiner

*Primary Examiner* — Dedei K Hammond
(74) *Attorney, Agent, or Firm* — Houtteman Law LLC

(57) ABSTRACT

The present invention discloses a stage lamp based on the TCP/IP protocol and its control system. The control system comprises a control terminal and a stage lamp. The control terminal and the stage lamp access a same local area network; a lamp control operation module is installed on the control terminal, and a user controls the stage lamp by performing a corresponding operation on the stage lamp control operation module, and sends a control instruction of the operation according to an agreed data communication format to the stage lamp via wireless wifi or a wired network based on the TCP/IP protocol; and the stage lamp parses the control instruction to obtain a corresponding control signal and performs a corresponding mechanical action and light output according to the control signal. The present invention, by using communication over the TCP/IP protocol, not only features openness for convenience of expansion, operation, and maintenance, but also simplifies an operation process and decreases professional skill requirements for each operator.

9 Claims, 2 Drawing Sheets

STAGE LAMP BASED ON TCP/IP PROTOCOL AND CONTROL SYSTEM THEREOF

TECHNICAL FIELD

The present invention relates to the field of stage control, in particular to a stage lamp based on the TCP/IP protocol and a control system thereof.

BACKGROUND ART

As the development of science and technology, a control on stage elements such as light, sound, video, machines and scenes is no longer limited to a manual control, and the emergence of a stage central-controlled system enables the control on the stage elements to be more accurate, thus resulting in perfect presentation of a more complex stage effect.

At present, the control of a stage lamp generally employs a DM512 protocol, and the DM512 protocol was first a way developed by USITT (United States Institute for Theatre Technology) for controlling a dimmer from a console by using a standard digital interface. DMX512 goes beyond an analog system but cannot completely substitute the analog simulation system. As its name implies, the protocol contains 512 data in one data packet, and each data is a binary signal of 0-255, is relatively low in complexity and contains address information, thus further decreasing the interoperability cost of manufacturers. The DMX512 protocol physically adopts binary parallel light brightness adjustment and data transmission so as to control light and auxiliary lighting equipment such as stage recreation equipment for controlling motion of lamps, controlling a pattern and color and controlling programming and running. Although the DMX512 protocol reduces the complexity for manually controlling the lamp to a certain extent, a stage lamp control system adopting the protocol is complex in accessing the lamp and transmitting a control signal, each lamp requires a dedicated line to connect the console, and each lamp and the console need to be matched in codes in a one-to-one correspondence manner so as to normally transmit the control signal; and moreover, since perfect presentation of the stage effect lies in reasonable matching and real-time control execution of light, sound, machines, scenes and videos in a performance, the stage control system requires professional stage technicians to perform the real-time operation and control on respective independent hardware consoles according to requirements of directors or scriptwriters, a requirement on professional skills of each operator is relatively high, the operation is very unfriendly, and non-professionals can hardly perform control skillfully.

SUMMARY OF THE INVENTION

A technical problem that the present invention needs to solve is: the currently adopted DMX512 protocol is relatively complex in terms of accessing of a stage lamp and transmission of a control signal, and moreover, a requirement on professional skills on each operator is relatively high, and non-professionals can hardly perform control skillfully.

To solve the above-mentioned technical problem, the technical solution adopted by the present invention is to provide a stage lamp based on the TCP/IP protocol, comprising a data parsing module, a drive module and a light emitting module;

the data parsing module receives a control instruction transmitted based on the TCP/IP protocol, and parses the control instruction to obtain a corresponding control signal; and the drive module and the light emitting module respectively enable the stage lamp to perform a corresponding mechanical action and emit light of corresponding color and brightness.

In the above-mentioned stage lamp, the data parsing module receives image data of a video image and a hand drawn graphic or picture from the user, parses the image data, and then redisplays the image data on a wall, a floor or other specific place in a real-time and synchronous manner through outputting optical projection.

The present invention further provides a stage lamp control system based on the TCP/IP protocol, comprising a control terminal and the stage lamp based on the TCP/IP protocol provided by the present invention;

the control terminal and the stage lamp access a same local area network;

a lamp control operation module is installed on the control terminal, and a user controls the stage lamp by performing a corresponding operation on the lamp control operation module, and sends a control instruction of the operation according to an agreed data communication format to the stage lamp via wireless wifi or a wired network based on the TCP/IP protocol; and the stage lamp parses the control instruction to obtain a corresponding control signal, and performs a corresponding mechanical action and light output according to the control signal.

In the above-mentioned solution, the control terminal is a tablet, a mobile phone, or a computer.

In the above-mentioned solution, a quantity of the control terminal is one or more, and different control terminals control different stage lamps to implement a same operation or control same stage lamps to implement different operations.

In the above-mentioned solution, the lamp control operation module is applicable to operating systems of windows, android and ios.

In the above-mentioned solution, the lamp control operation module is provided with a building geographical information cad modeling unit, the building geographical information cad modeling unit is used to perform modeling on a physical location of a building and physical locations of all stage lamps in the building, and virtualize a multi-dimensional graphic on a display screen of the control terminal, and the user triggers and controls all the stage lamps by clicking with a mouse or touching.

In the above-mentioned solution, the control terminal sends the image data of the video image and the hand drawn graphic or picture from the user to the stage lamp in real time, and the data parsing module of the stage lamp parses the received image data and redisplays the image data on the wall, the floor or the other specific place in a real-time and synchronous manner through outputting optical projection.

In the above-mentioned solution, the control terminal and the stage lamp adopt a combined operation way of a Real-time Transport Protocol RTP and a Real-time Transport Control Protocol RTCP to transmit the image data of the video image, and the hand drawn graphic and picture.

In the above-mentioned solution, the parsing module of the stage lamp comprises a DLP processing unit; the drive module comprises a base motor drive unit; the light emitting module comprises a light source drive unit;

the motor drive unit controls the stage lamp to turn mechanically according to the control signal so as to output an effect of the stage lamp to a specified geographic location;

the DLP processing unit digitizes an image data signal output by a master controller to obtain a digital signal; and the light source drive unit outputs a light source of corresponding color and brightness according to the digital signal output by the DLP processing unit, and projects light through a corresponding light transmission path.

A communication media of the present invention utilizes an existing wireless wife and wired network, and adopts the TCP/IP protocol as a communication protocol, which features openness and maturity for convenience of expansion, operation, and maintenance. In addition, in the control system based on TCP/IP technology, by simply clicking through a mouse, a software system can discover a device through scanning an IP address and easily establishes a connection between a master controller and a stage lamp device terminal according to the IP address obtained through scanning. In this way, without need for one-to-one code correspondence, a control instruction and data are parsed directly, and a corresponding operation is performed directly without need to convert a parsed data into a DMX512 signal, thus simplifying an operation process and lowering professional skill requirements for each operator. Furthermore, primary control of each stage lamp can be realized as long as a control chip that can be wirelessly connected is inserted into each stage lamp.

DETAILED DESCRIPTION OF THE PREFERRED EMBODIMENTS

The present invention is described below in further detail with reference to the drawings of the description and embodiments.

Figure 1:
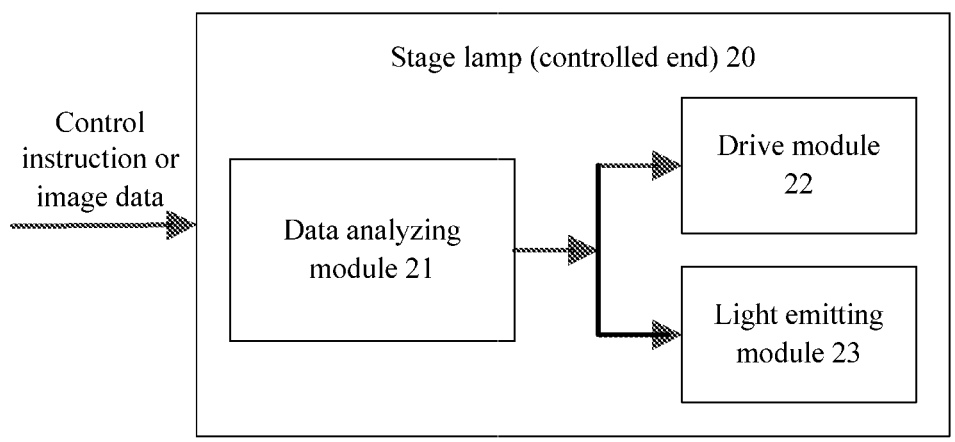
FIG. 1 is a schematic structural diagram of a stage lamp control system based on the TCP/IP protocol provided by the present invention.

As shown in FIG. 1, a stage lamp 20 based on the TCP/IP protocol provided by the present invention comprises a data parsing module 21, a drive module 22 and a light emitting module 23; the data parsing module 21 parses a received control instruction to obtain a corresponding control signal; the drive module 22 and the light emitting module 23 respectively enable the stage lamp 20 to perform a corresponding mechanical action (such as rotating and orbital operation) according to the control signal to output an effect of the stage lamp to a specific geographic location and emit light of corresponding color and brightness. The data parsing module 21 can also receive image data of a video image and a hand drawn graphic or picture from the user, parses the image data, and then redisplays the image data on a wall, a floor or other specific place in a real-time and synchronous manner through outputting optical projection, thus realizing various effects to satisfy various requirements of clients for different places.

Figure 2:
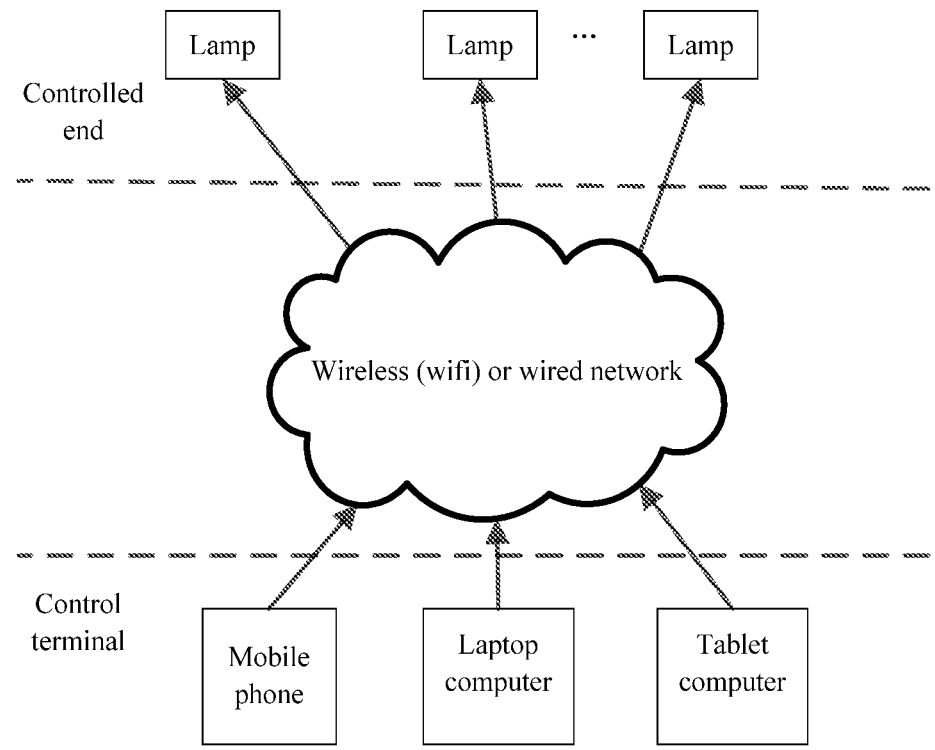
FIG. 2 is a topological diagram of a stage lamp control system based on the TCP/IP protocol provided by the present invention.
Figure 3:
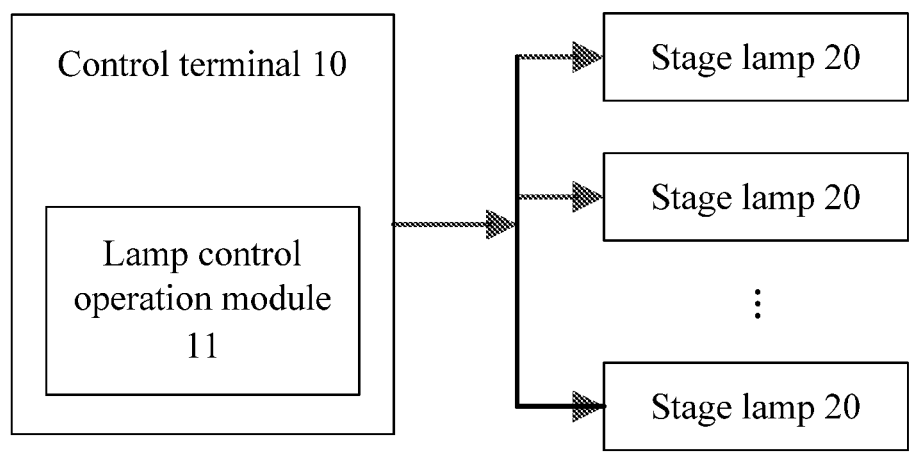
FIG. 3 is a schematic structural diagram of a stage lamp control system based on the TCP/IP protocol provided by the present invention.

As shown in FIG. 2, the present invention also provides a stage lamp control system based on the TCP/IP protocol, comprising a control terminal 10 and a plurality of stage lamps 20 shown in FIG. 1 that access a same local area network, wherein the master control terminal 10 and the stage lamps 20 are based on an embedded operating system of android, linux, wices or windows.

The control terminal 10 is a tablet, mobile phone or computer (PC, Personal Computer), and the like. A dedicated lamp control operation module 11 is installed on the control terminal 10, and a user controls the stage lamp by performing a corresponding operation on the lamp control operation module 11, and sends a control instruction of the operation according to an agreed data communication format to the stage lamp 20 via wireless wifi or a wired network based on the TCP/IP protocol In the present invention, a quantity of the control terminal 10 may be one or more, and different control terminals 10 control different stage lamps to implement a same operation or control same stage lamps to implement different operations. For example, in a same stage lamp control system provided by the present invention, a control terminal A controls a stage lamp A1 to turn on, a control terminal B controls a stage lamp B1 to turn on, and a control terminal C controls a stage lamp A1 and a stage lamp B1 to turn.

The stage lamp 20 parses the received control instruction to obtain a corresponding control signal, and performs a corresponding operation according to the control signal, so as to implement various light effects of the stage lamp.

In the present invention, the lamp control operation module 11 is multi-platform control software of windows, android and ios, which covers systems operating in present mainstream hardware media terminals, making it convenient for users to make choices based on their demands. Meanwhile, a building geographic information cad modeling unit is arranged in the lamp control operation module. The building geographic information cad modeling unit carries out modeling for the physical locations of an actually existing huge building and all stage lamps 20 in the huge building and shows their multi-dimensional graphs on a tiny display screen of the control terminal in a virtual manner. In this manner, a user can trigger and control all the stage lamps 20 merely by clicking the screen by means of a mouse or by way of touching. During operation, the user not only has the perception of an overall situation of planning a strategy in the tent and gaining a decisive victory a thousand miles away, but also utilizes a great number of triggering mechanisms, which reduces the intervention of manual mechanical operation that is time consuming and laborious, thus liberating labor force and reducing man-made operation errors; meanwhile, when the physical location of a stage lamp 20 in the building changes, the stage lamp 20 will send its current position information to the control terminal 10 which makes modifications to the position of the stage lamp 20 in the building model according to the position information.

In the present invention, the control terminal 10 can also send the image data of the video image and the hand drawn graphic in on-site, real-time and synchronous presentation or picture from the user to the stage lamp 20 in real time, wherein the data parsing module 21 of the stage lamp 20 parses these received image data and redisplays them on the video image and the hand drawn graphic or picture in a real-time and synchronous manner through outputting optical projection. Herein, the control terminal 10 and the stage lamp 20 adopt a combined working transmission way of Realtime Transport Protocol RTP and Realtime Transport Control Protocol RTCP to transmit the image data of the video image, and the hand drawn graphic and picture. Based on the above-mentioned two protocols, the present invention subdivides and realizes data sent by the control terminal, which can reliably transmit the data to the stage lamp 20 with the minimum delay.

As can be seen, the data parsing module 21 of the stage lamp 20 of the present invention, which acts as the receiving and parsing module of system data and instructions, is a pivot connecting the control intent of the lamp control operation module 11 and the execution way of the control and execution circuits (comprising the drive module 22 and the light emitting module 23) of the stage lamp. It not only takes the responsibility to convert a user instruction into a specific physical control signal, such as converting instructions which control the on-off actions of a lamp, the effect of light color and the turning of the base motor of a stage lamp into corresponding hardware signals (such as gpio high-low electrical levels required to control the on-off actions of the lamp and the PWM signal required to control the effect of light color or the driving of the motor), but can also parse such real-time data as the received video image, hand drawn graphic and picture and redisplay them through simultaneous projection.

In the present invention, the stage lamp 20 also comprises a power supply module providing power for all the modules of the stage lamp; wherein the parsing module 21 comprises a DLP processing unit; the drive unit 22 comprises a base motor drive unit; the light emitting module 23 comprises a light source drive unit; the base motor drive unit controls to turn mechanically according to the control signal parsed by parsing module 21 so as to output tan effect of the stage lamp to a specific geographic location; the DLP processing unit digitizes the data signal of a video image, hand drawn graphic or picture output by the control terminal 10 to obtain a digital signal; and the light source drive unit outputs a light source of corresponding color and brightness according to the digital signal output by the DLP processing unit, and projects light through a corresponding light transmission path to realize the projection and redisplay of such image data as a video image, and hand drawn graphic or picture.

It is apparent to those skilled in the art that various modifications and variations of the present invention can be made without departing from the spirit and scope of the invention. It is intended that the present invention covers the modifications and variations of this invention provided they come within the scope of the appended claims and their equivalents.

The invention claimed is:

1. A stage lamp based on the TCP/IP protocol, comprising a data parsing module, a drive module and a light emitting module;
   the data parsing module receives a control instruction transmitted based on the TCP/IP protocol, and parses the control instruction to obtain a corresponding control signal; and
   the drive module and the light emitting module respectively enable the stage lamp to perform a corresponding mechanical action and emit light of corresponding color and brightness;
   wherein the data parsing module receives image data of a video image or a hand drawn graphic or picture from the user, parses the image data, and then redisplays the image data on a wall, a floor or other specific place in a real-time and synchronous manner through outputting optical projection.

2. A stage lamp control system based on the TCP/IP protocol, comprising a control terminal and the stage lamp of claim 1;
   the control terminal and the stage lamp access a same local area network;
   a lamp control operation module is installed on the control terminal, and a user controls the stage lamp by performing a corresponding operation on the lamp control operation module, and sends a control instruction of the operation according to an agreed data communication format to the stage lamp via wireless Wi-Fi or a wired network based on the TCP/IP protocol; and
   the stage lamp parses the control instruction to obtain a corresponding control signal, and performs a corresponding mechanical action and light output according to the control signal.

3. The stage lamp control system of claim 2, wherein the control terminal is a tablet, a mobile phone, or a computer.

4. The stage lamp control system of claim 2, wherein a quantity of the control terminal is one or more, and different control terminals control different stage lamps to implement a same operation or control same stage lamps to implement different operations.

5. The stage lamp control system of claim 2, wherein the lamp control operation module is applicable to operating systems of Windows®, Android®, and IOS®.

6. The stage lamp control system of claim 2, wherein the lamp control operation module is provided with a building geographical information Computer Aided Design (CAD) modeling unit, the building geographical information CAD modeling unit is used to perform modeling on a physical location of a building and physical locations of all stage lamps in the building, and virtualize a multi-dimensional graphic on a display screen of the control terminal, and the user triggers and controls all the stage lamps by clicking with a mouse or touching.

7. The stage lamp control system of claim 2, wherein the control terminal sends the image data of the video image or the hand drawn graphic or picture from the user to the stage lamp in real time, and the data parsing module of the stage lamp parses the received image data and redisplays the image data on the wall, the floor or the other specific place in a real-time and synchronous manner through outputting optical projection.

8. The stage lamp control system of claim 7, wherein the control terminal and the stage lamp adopt a combined operation way of a Real-time Transport Protocol RTP and a Real-time Transport Control Protocol RTCP to transmit the image data of the video image, and the hand drawn graphic and picture.

9. The stage lamp control system of claim 7, wherein the data parsing module of the stage lamp comprises a DLP processing unit; the drive module comprises a base motor drive unit; the light emitting module comprises a light source drive unit;
   the motor drive unit controls the stage lamp to turn mechanically according to the control signal so as to output an effect of the stage lamp to a specified geographic location;
   the DLP processing unit digitizes an image data signal output by a master controller to obtain a digital signal; and
   the light source drive unit outputs a light source of corresponding color and brightness according to the digital signal output by the DLP processing unit, and projects light through a corresponding light transmission path.

* * * * *